United States Patent
Baldi et al.

(10) Patent No.: US 10,486,938 B2
(45) Date of Patent: *Nov. 26, 2019

(54) ELEVATOR SERVICE REQUEST USING USER DEVICE

(71) Applicant: Otis Elevator Company, Farmington, CT (US)

(72) Inventors: Emily Baldi, East Hartford, CT (US); Kelly Martin Dubois, Unionville, CT (US); Paul A. Simcik, Southington, CT (US); Harrison Daniels, Simsbury, CT (US); Yew H. Leong, Simsbury, CT (US); Sylvia Stone, Brooklyn, NY (US); Staci Weixlmann, New York, NY (US); Sheryl Brothers, Wethersfield, CT (US)

(73) Assignee: OTIS ELEVATOR COMPANY, Farmington, CT (US)

(\*) Notice: Subject to any disclaimer, the term of this patent is extended or adjusted under 35 U.S.C. 154(b) by 0 days.

This patent is subject to a terminal disclaimer.

(21) Appl. No.: 15/366,148

(22) Filed: Dec. 1, 2016

(65) Prior Publication Data

US 2018/0118512 A1 May 3, 2018

Related U.S. Application Data

(60) Provisional application No. 62/414,225, filed on Oct. 28, 2016.

(51) Int. Cl.
*B66B 3/00* (2006.01)
*B66B 1/46* (2006.01)
(Continued)

(52) U.S. Cl.
CPC .............. *B66B 1/468* (2013.01); *B66B 9/00* (2013.01); *B66B 2201/4615* (2013.01); *B66B 2201/4653* (2013.01); *H04W 88/06* (2013.01)

(58) Field of Classification Search
CPC .................. B66B 3/006; B66B 1/468
(Continued)

(56) References Cited

U.S. PATENT DOCUMENTS 4,673,911 A * 6/1987 Yoshida .................. B66B 1/468
187/380
5,554,832 A * 9/1996 Lumme .................... B66B 1/468
187/380
(Continued)

FOREIGN PATENT DOCUMENTS

| CN | 103135913 | 6/2013 |
| EP | 2730530 A1 | 5/2014 |

(Continued)

OTHER PUBLICATIONS

Apple, [online]; [retrieved on Nov. 4, 2016] retrieved from the Internet https://support.apple.com/en-us/HT204343 "Delete music, movies, apps, books, and other content from your iPhone, iPad, or iPod touch", 7 pages.

(Continued)

*Primary Examiner* — David S Warren
(74) *Attorney, Agent, or Firm* — Cantor Colburn LLP

(57) ABSTRACT

Methods and systems for making elevator service requests, the methods including populating, by a computing device comprising a processor, a recents list with at least one retained floor pair, wherein each retained floor pair includes an origination floor and a destination floor, displaying the recents list on a display, receiving a user input on the recents list indicating a new elevator service request related to one of the retained floor pairs, generating an elevator service request packet based on the new elevator service request, and transmitting the elevator service request packet to an elevator controller to make an elevator service request.

20 Claims, 7 Drawing Sheets

(51) Int. Cl.
   *B66B 9/00* (2006.01)
   *H04W 88/06* (2009.01)
(58) Field of Classification Search
   USPC ............................................. 187/247, 381
   See application file for complete search history.

(56) References Cited

U.S. PATENT DOCUMENTS

| | | | | |
|---|---|---|---|---|
| 6,382,363 B1* | 5/2002 | Friedli | ............ | B66B 1/468 |
| | | | | 187/384 |
| 6,550,587 B1 | 4/2003 | Yuasa et al. | | |
| 6,907,575 B2 | 6/2005 | Duarte | | |
| 7,021,429 B2* | 4/2006 | Hikita | ............ | B66B 1/462 |
| | | | | 187/391 |
| 7,377,364 B2 | 5/2008 | Tyni et al. | | |
| 7,445,090 B2* | 11/2008 | Bodmer | ............ | B66B 1/463 |
| | | | | 187/391 |
| 7,500,544 B2 | 3/2009 | Hakala et al. | | |
| 7,657,849 B2 | 2/2010 | Chaudhri et al. | | |
| 7,766,129 B2 | 8/2010 | Makela et al. | | |
| 7,890,778 B2 | 2/2011 | Jobs et al. | | |
| 7,958,971 B2* | 6/2011 | Mangini | ............ | B66B 1/463 |
| | | | | 187/380 |
| 8,069,957 B2* | 12/2011 | Miyajima | ............ | B66B 1/468 |
| | | | | 187/382 |
| 8,136,636 B2* | 3/2012 | Bahjat | ............ | B66B 1/463 |
| | | | | 187/391 |
| 8,151,942 B2* | 4/2012 | Rusanen | ............ | B66B 1/468 |
| | | | | 187/247 |
| 8,210,321 B2* | 7/2012 | Finschi | ............ | B66B 1/18 |
| | | | | 187/388 |
| 8,230,979 B2* | 7/2012 | Finschi | ............ | B66B 1/14 |
| | | | | 187/387 |
| 8,631,357 B2 | 1/2014 | Little | | |
| 8,662,256 B2* | 3/2014 | Asano | ............ | B66B 1/2458 |
| | | | | 187/380 |
| 8,713,469 B2 | 4/2014 | Park et al. | | |
| 8,813,917 B2* | 8/2014 | Salmikuukka | ............ | B66B 1/468 |
| | | | | 187/247 |
| 8,820,486 B2* | 9/2014 | Gerstenkorn | ............ | B66B 1/468 |
| | | | | 187/247 |
| 8,880,200 B2* | 11/2014 | Nowel | ............ | B66B 1/468 |
| | | | | 187/247 |
| 8,910,068 B2 | 12/2014 | Shin et al. | | |
| 9,242,834 B2* | 1/2016 | Terry | ............ | B66B 1/468 |
| 9,284,158 B2 | 3/2016 | Sarjanen | | |
| 9,323,232 B2* | 4/2016 | Blom | ............ | H04W 4/029 |
| 9,395,905 B2 | 7/2016 | Wherry | | |
| 9,469,502 B2* | 10/2016 | Parkkinen | ............ | B66B 3/006 |
| 9,807,049 B2* | 10/2017 | Halliday | ............ | H04L 51/32 |
| 2003/0085079 A1 | 5/2003 | Koehler et al. | | |
| 2004/0060777 A1 | 4/2004 | Takeuchi | | |
| 2007/0017753 A1 | 1/2007 | Ylinen et al. | | |
| 2007/0067328 A1 | 3/2007 | Mingot et al. | | |
| 2007/0151809 A1 | 7/2007 | Tyni et al. | | |
| 2007/0186183 A1 | 8/2007 | Hudson | | |
| 2008/0067013 A1 | 3/2008 | Ylinen et al. | | |
| 2009/0022131 A1 | 1/2009 | Rusanen et al. | | |
| 2010/0093365 A1 | 4/2010 | Bloebaum | | |
| 2012/0031711 A1 | 2/2012 | Gerstenkorn et al. | | |
| 2012/0037461 A1* | 2/2012 | Finschi | ............ | B66B 1/468 |
| | | | | 187/382 |
| 2012/0105489 A1 | 5/2012 | Monroe et al. | | |
| 2012/0138388 A1* | 6/2012 | Finschi | ............ | B66B 1/2458 |
| | | | | 187/247 |
| 2013/0054033 A1 | 2/2013 | Casilli | | |
| 2013/0111346 A1 | 5/2013 | Little | | |
| 2013/0205257 A1 | 8/2013 | Albright | | |
| 2013/0245832 A1* | 9/2013 | Blom | ............ | H04W 4/029 |
| | | | | 700/275 |
| 2014/0059482 A1 | 2/2014 | Won | | |
| 2014/0115436 A1* | 4/2014 | Beaver | ............ | G06F 17/2288 |
| | | | | 715/229 |
| 2014/0131142 A1 | 5/2014 | Parkkinen et al. | | |
| 2014/0195943 A1 | 7/2014 | Zheng et al. | | |
| 2014/0359510 A1 | 12/2014 | Graf et al. | | |
| 2014/0365968 A1 | 12/2014 | Beaver et al. | | |
| 2015/0065077 A1 | 3/2015 | Kim et al. | | |
| 2015/0158693 A1 | 6/2015 | Talonen et al. | | |
| 2015/0246790 A1* | 9/2015 | Hiltunen | ............ | B66B 1/461 |
| | | | | 187/382 |
| 2015/0346916 A1 | 12/2015 | Jisrawi et al. | | |
| 2015/0378446 A1 | 12/2015 | Masseron et al. | | |
| 2015/0378545 A1 | 12/2015 | Telang et al. | | |
| 2016/0090270 A1 | 3/2016 | Wang | | |
| 2016/0122157 A1 | 5/2016 | Keser | | |
| 2016/0130113 A1 | 5/2016 | Tokura | | |
| 2016/0347578 A1 | 12/2016 | Simcik | | |
| 2016/0376124 A1 | 12/2016 | Bunter et al. | | |
| 2017/0073186 A1* | 3/2017 | Parviainen | ............ | B66B 1/468 |
| 2017/0122744 A1* | 5/2017 | Long | ............ | G01C 21/005 |
| 2017/0297864 A1 | 10/2017 | Koivisto et al. | | |
| 2017/0313546 A1 | 11/2017 | King | | |
| 2018/0099839 A1* | 4/2018 | Williams | ............ | B66B 1/468 |
| 2018/0118510 A1* | 5/2018 | Simcik | ............ | B66B 1/468 |
| 2018/0118511 A1* | 5/2018 | Baldi | ............ | B66B 1/468 |
| 2018/0118512 A1* | 5/2018 | Baldi | ............ | B66B 1/468 |
| 2018/0121072 A1* | 5/2018 | Baldi | ............ | H04W 4/029 |
| 2018/0282115 A1 | 10/2018 | Baldi et al. | | |

FOREIGN PATENT DOCUMENTS

| | | |
|---|---|---|
| EP | 2730530 | 6/2015 |
| EP | 3184476 A1 | 6/2017 |
| JP | 2005231755 A | 9/2005 |
| KR | 101374208 | 3/2014 |
| WO | 2010134748 A2 | 11/2010 |
| WO | 2011041885 A1 | 4/2011 |
| WO | 2014049201 A1 | 4/2014 |
| WO | 2014049202 A1 | 4/2014 |
| WO | 2014178790 A1 | 11/2014 |
| WO | 2015084396 A1 | 6/2015 |
| WO | 2015094178 A1 | 6/2015 |
| WO | 2015121294 A1 | 8/2015 |
| WO | 2015187266 A1 | 12/2015 |
| WO | 2016099713 A1 | 6/2016 |
| WO | 2016135371 A1 | 9/2016 |

OTHER PUBLICATIONS

Turunen, et al. "Mobile Interaction with Elevators—Improving People Flow in Complex Buildings", Academic Mindtrek (2013) 8 pgs.
European Search Report, European Application No. 17198966.8, dated Apr. 10, 2018, European Patent Office; European Search Report 8 pages.

* cited by examiner

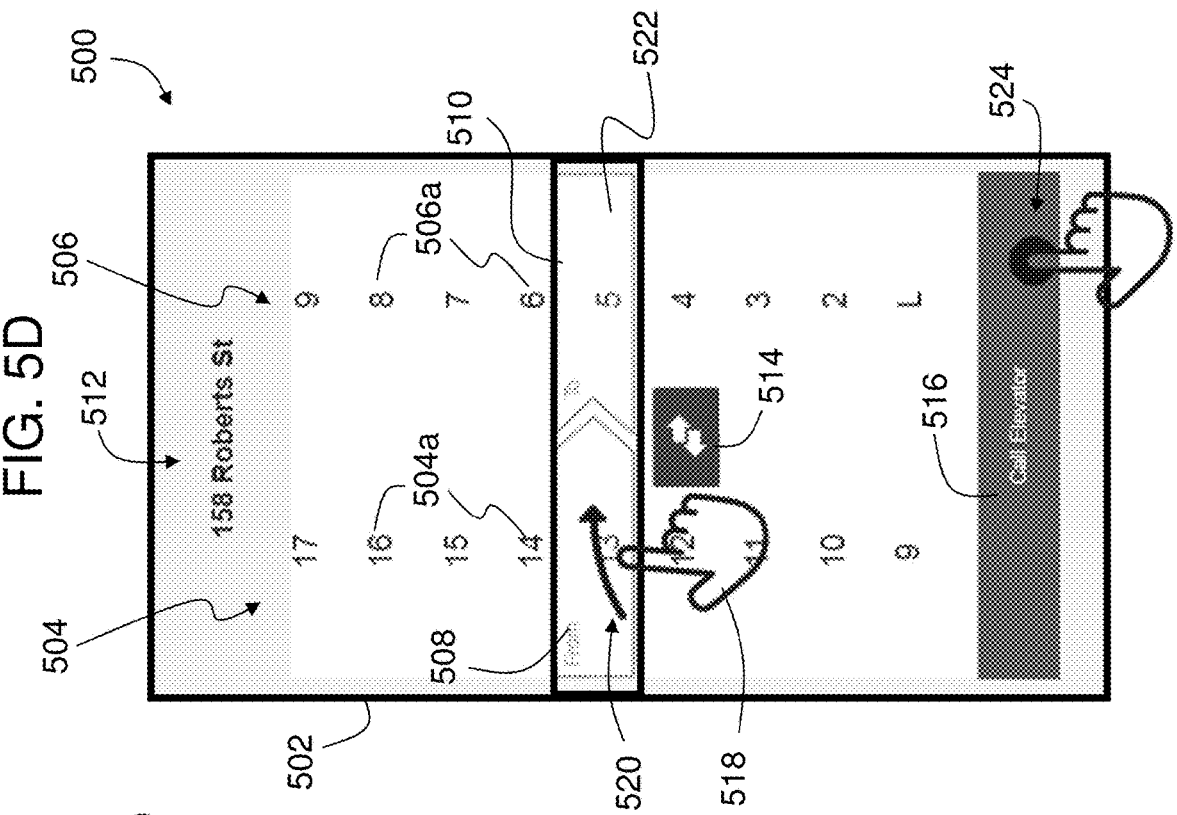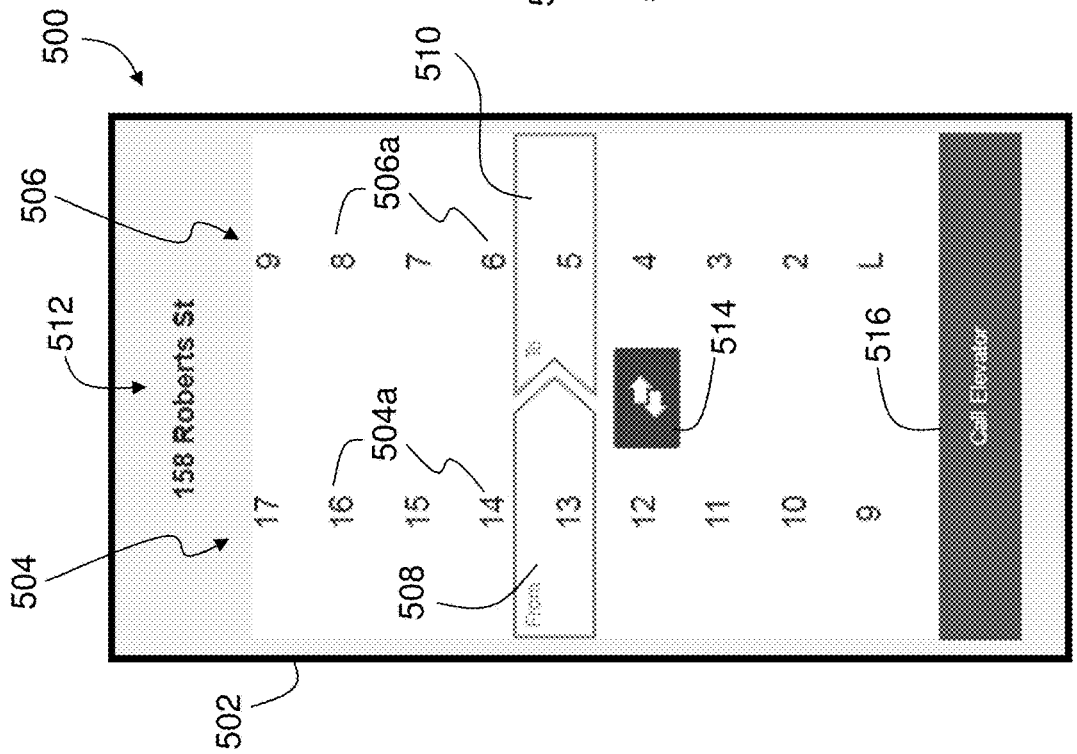

ELEVATOR SERVICE REQUEST USING USER DEVICE

CROSS-REFERENCE TO RELATED APPLICATIONS

The present application claims priority from U.S. Provisional Patent Application No. 62/414,225, filed Oct. 28, 2016. The contents of the priority application are hereby incorporated by reference in their entirety.

BACKGROUND

The subject matter disclosed herein generally relates to elevator service requests for elevators and, more particularly, to elevator service requests using user devices.

Elevator systems can receive input from users through mechanical, electrical, and/or electromechanical device located within or as part of the elevator system. That is, requests for elevator service are typically made by potential passengers when the passenger is already located at an elevator landing. However, having remote mechanism to make such requests may be advantageous. For example, the use of personal user devices can enable remote elevator service requests, thus improving user experience and/or enabling improved elevator management within a building. Further improvements thereon may be desirable.

BRIEF SUMMARY

According to one embodiment, methods for making elevator service requests are provided. The methods include populating, by a computing device comprising a processor, a recents list with at least one retained floor pair, wherein each retained floor pair includes an origination floor and a destination floor, displaying the recents list on a display, receiving a user input on the recents list indicating a new elevator service request related to one of the retained floor pairs, generating an elevator service request packet based on the new elevator service request, and transmitting the elevator service request packet to an elevator controller to make an elevator service request.

In addition to one or more of the features described herein, or as alternatives, further embodiments of the methods may include that the elevator service request packet includes information including the origination floor and the destination floor.

In addition to one or more of the features described herein, or as alternatives, further embodiments of the methods may include that the computing device is a smartphone.

In addition to one or more of the features described herein, or as alternatives, further embodiments of the methods may include displaying an information region on the user interface, the information region including building information.

In addition to one or more of the features described herein, or as alternatives, further embodiments of the methods may include displaying a call elevator icon on the user interface in the recents list, the call elevator icon associated with the user input regarding an elevator service request and the user input received on the recents list is at the call elevator icon.

In addition to one or more of the features described herein, or as alternatives, further embodiments of the methods may include receiving a swipe input on the recents list, displaying a remove icon proximate the user input regarding an elevator service request, receiving input at the remove icon, and deleting the user input regarding an elevator service request based on the input received at the remove icon.

In addition to one or more of the features described herein, or as alternatives, further embodiments of the methods may include receiving a swipe input on the recents list, wherein generating the elevator service request packet is based on the swipe input.

In addition to one or more of the features described herein, or as alternatives, further embodiments of the methods may include receiving input to generate a new trip and displaying a first scrollable wheel and a second scrollable wheel, wherein each scrollable wheel includes a plurality of list elements associated with floors within a building.

In addition to one or more of the features described herein, or as alternatives, further embodiments of the methods may include storing data related to a most recent elevator trip in a memory and displaying a retained floor pair associated with the most recent elevator trip on the display at a top of the recents list.

In addition to one or more of the features described herein, or as alternatives, further embodiments of the methods may include storing data related to a plurality of elevator trips in a memory, wherein the data comprises at least one of a time of day and a location of a user and displaying a retained floor pair associated with the data on the display at a top of the recents list.

According to another embodiment, user devices for making elevator service requests are provided. The user devices include at least one processor, a display, and memory having instructions stored thereon. When executed by the at least one processor, the instructions cause the user device to populate a recents list with at least one retained floor pair, wherein each retained floor pair includes an origination floor and a destination floor, display the recents list on the display, receive a user input on the recents list indicating a new elevator service request related to one of the retained floor pairs, generate an elevator service request packet based on the new elevator service request, and transmit the elevator service request packet to an elevator controller to make an elevator service request.

In addition to one or more of the features described herein, or as alternatives, further embodiments of the user devices may include that the elevator service request packet includes information including the origination floor and the destination floor.

In addition to one or more of the features described herein, or as alternatives, further embodiments of the user devices may include that the computing device is a smartphone.

In addition to one or more of the features described herein, or as alternatives, further embodiments of the user devices may include that the instructions further include instructions to display an information region on the user interface, the information region including building information.

In addition to one or more of the features described herein, or as alternatives, further embodiments of the user devices may include that the instructions further include instructions to display a call elevator icon on the user interface in the recents list, the call elevator icon associated with the user input regarding an elevator service request and wherein the user input received on the recents list is at the call elevator icon.

In addition to one or more of the features described herein, or as alternatives, further embodiments of the user devices may include that the instructions further include instructions to receive a swipe input on the recents list, display a remove icon proximate the user input regarding an elevator service request, receive input at the remove icon, and delete the user input regarding an elevator service request based on the input received at the remove icon.

In addition to one or more of the features described herein, or as alternatives, further embodiments of the user devices may include that the instructions further include instructions to receive a swipe input on the recents list, wherein generating the elevator service request packet is based on the swipe input.

In addition to one or more of the features described herein, or as alternatives, further embodiments of the user devices may include that the instructions further include instructions to receive input to generate a new trip and display a first scrollable wheel and a second scrollable wheel, wherein each scrollable wheel includes a plurality of list elements associated with floors within a building.

In addition to one or more of the features described herein, or as alternatives, further embodiments of the user devices may include that the instructions further include instructions to store data related to a most recent elevator trip in a memory and display a retained floor pair associated with the most recent elevator trip on the display at a top of the recents list.

In addition to one or more of the features described herein, or as alternatives, further embodiments of the user devices may include that the instructions further include instructions to store data related to a plurality of elevator trips in a memory, wherein the data comprises at least one of a time of day and a location of a user and display a retained floor pair associated with the data on the display at a top of the recents list.

Technical effects of embodiments of the present disclosure include user devices and methods of operation configured to provide user interfaces and receive inputs thereon to generate elevator service requests.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

FIG. 5C is another schematic illustration of the user interface of FIG. 5A;

FIG. 5D is another schematic illustration of the user interface of FIG. 5A;

DETAILED DESCRIPTION

Figure 1:
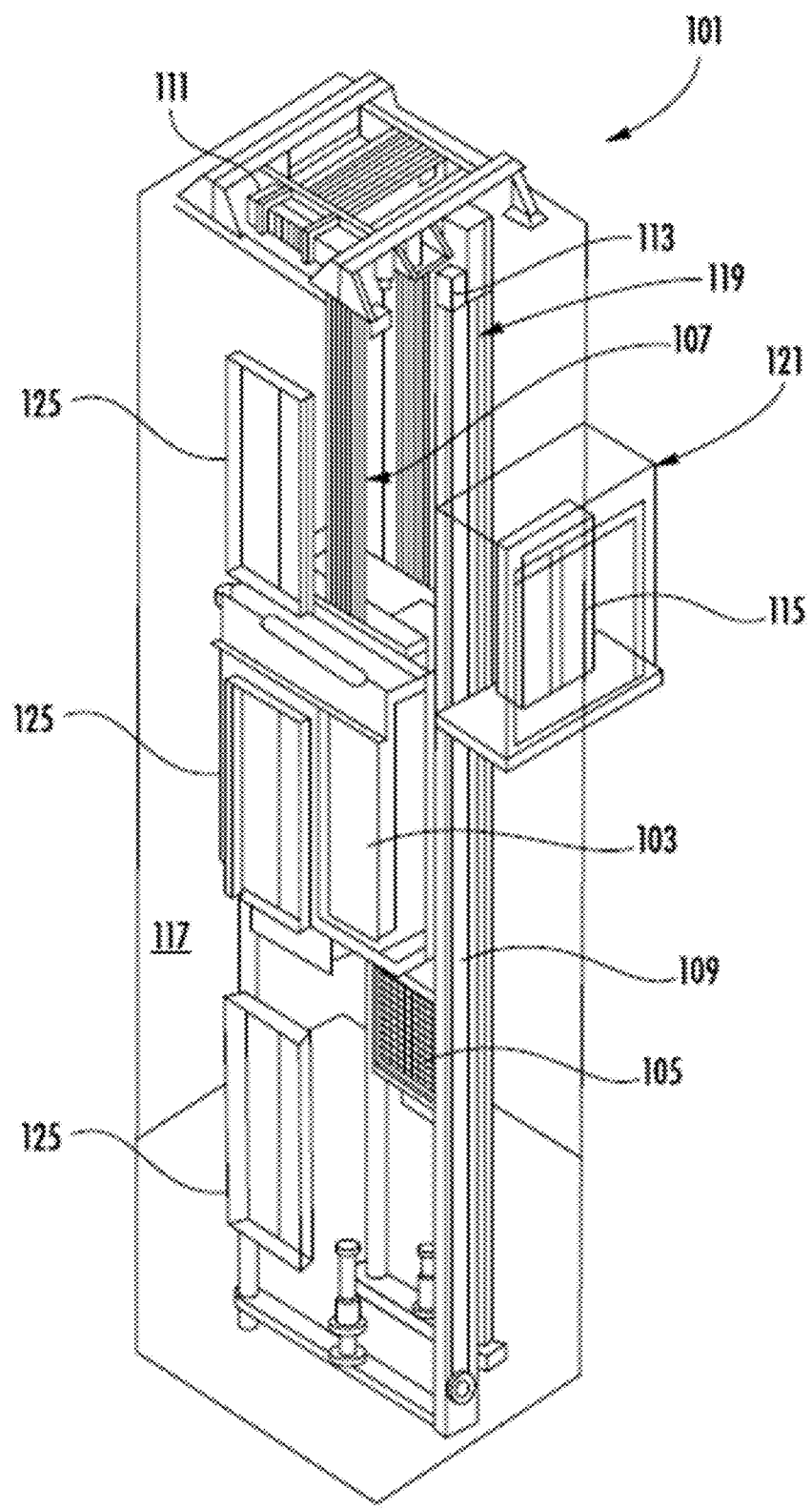
FIG. 1 is a schematic illustration of an exemplary elevator system that may employ various embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1 is a perspective view of an elevator system 101 including an elevator car 103, a counterweight 105, a roping 107, a guide rail 109, a machine 111, a position encoder 113, and a controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position encoder 113. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor.

Although shown and described with a roping system, elevator systems that employ other methods and mechanisms of moving an elevator car within an elevator shaft, including ropeless elevator systems and/or elevator systems with more than one elevator car in each elevator shaft, may employ embodiments of the present disclosure. FIG. 1 is merely a non-limiting example presented for illustrative and explanatory purposes. It should be appreciated that any elevator system or system configuration may be employed.

Figure 2:
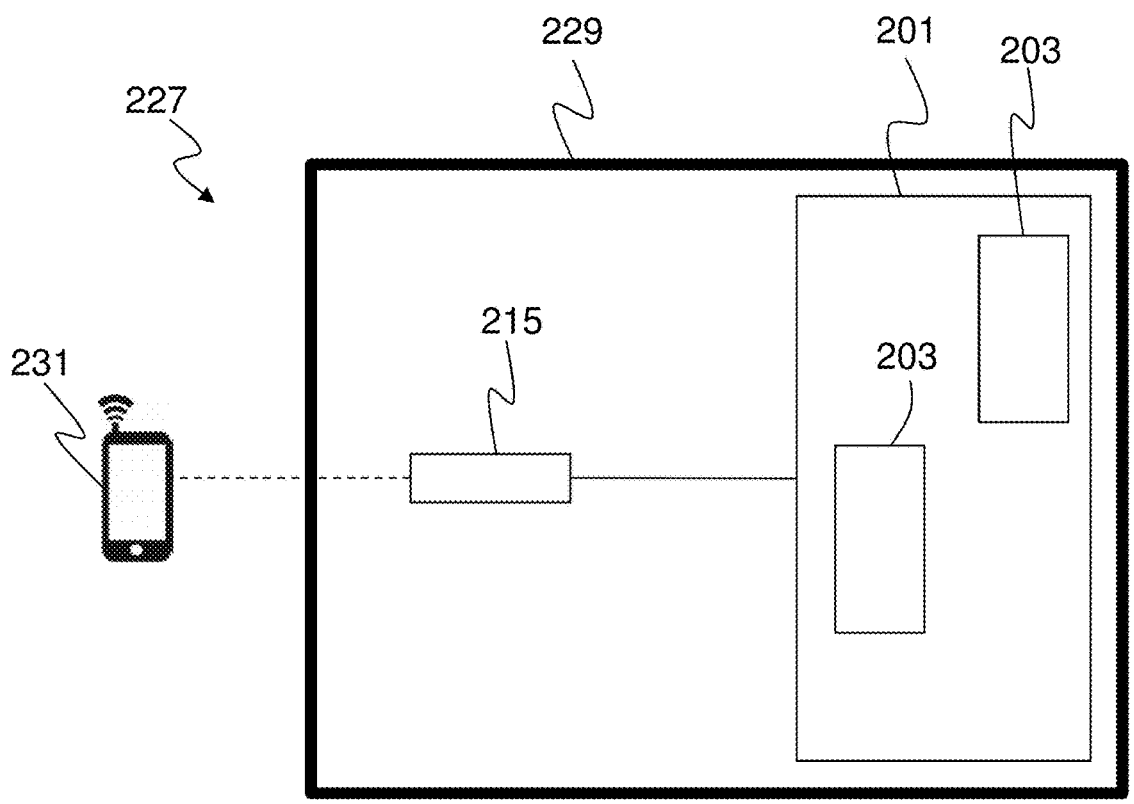
FIG. 2 is a schematic block diagram illustrating a system that may be configured in accordance with one or more embodiments of the present disclosure.

Turning now to FIG. 2, a schematic illustration of a building system 227 in an example embodiment of the present disclosure is shown. The building system 227 includes an elevator system 201 installed within a structure 229 (e.g., a building). In some embodiments, the structure 229 may be an office building or a collection of office buildings that may or may not be physically located near each other. The structure 229 may include any number of floors that are accessible by the elevator system 201 and thus the structure 229 can include any number of landings (e.g., as shown in FIG. 1). Persons entering the structure 229 may enter at a lobby floor and may travel to a destination floor via one or more elevator cars 203 that are part of the elevator system 201.

The elevator system 201 may include one or more computing devices, such as an elevator controller 215. The elevator controller 215 may be configured to control dispatching operations for one or more elevator cars 203 associated with the elevator system 201. It is understood that the elevator system 201 may utilize more than one elevator controller 215, and that each elevator controller may control a group of elevators cars 203. Although two elevator cars 203 are shown in FIG. 2, those of skill in the art will appreciate that any number of elevators cars may be employed in the elevator and building systems that employ embodiments of the present disclosure. The elevator cars 203 can be located in the same hoistway or in different hoistways so as to allow coordination amongst elevator cars 201 in different elevator banks serving different floors (e.g., sky lobbies, etc.). It is understood that the elevator system 201 may include various features as described above with reference to FIG. 1 and may also include other non-depicted elements and/or features as known in the art (e.g., drive, counterweight, safeties, etc.). Moreover, the elevators may be employed in any configuration with all elevators serving all floors of the building, some elevators only serving certain floors, a first group of elevator serving lower floors of a building and a sky lobby and a second group of elevators serving the sky lobby and upper floors of the building, etc.

Figure 4A:
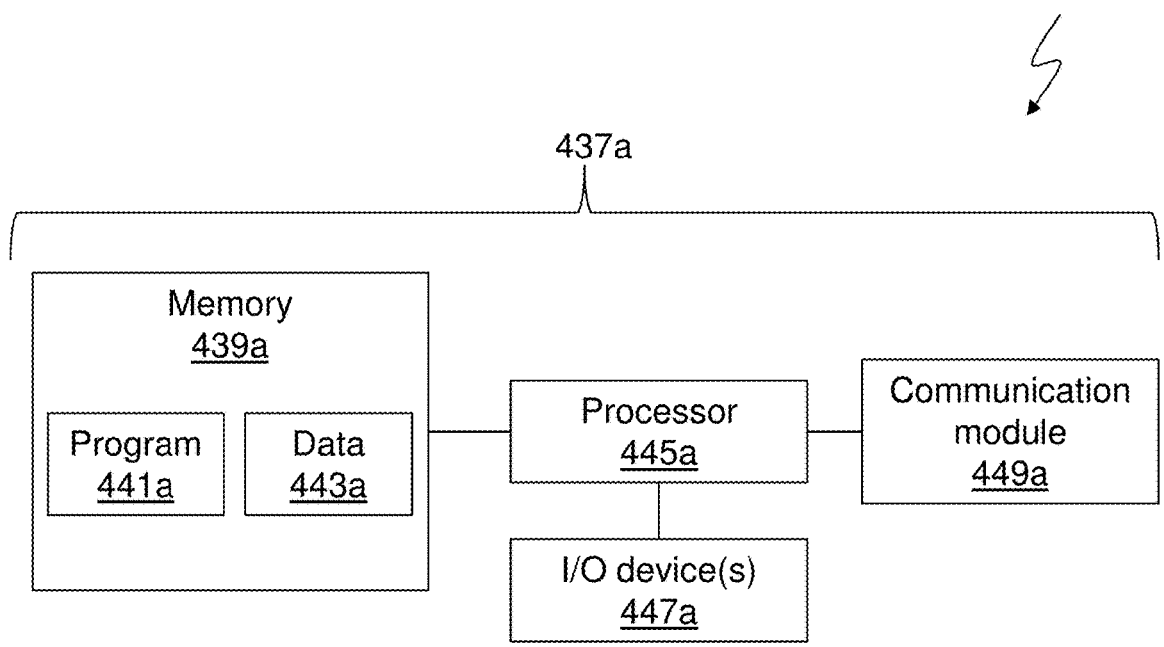
FIG. 4A is a schematic illustration of a computing system of a user device in accordance with an embodiment of the present disclosure.

Also shown in FIG. 2 is a user device 231, such as a mobile device (e.g., smart phone, smart watch, wearable technology, laptop, tablet, etc.). The user device 231 may include a mobile and/or personal device that is typically carried by a person, such as a phone, PDA, etc. The user device 231 may include a processor, memory, and communication module(s), as shown in FIG. 4A. As described below, the processor can be any type or combination of computer processors, such as a microprocessor, microcontroller, digital signal processor, application specific integrated circuit, programmable logic device, and/or field programmable gate array. The memory can be a non-transitory computer readable storage medium tangibly embodied in the user device 231 including executable instructions stored therein, for instance, as firmware. The communication module may implement one or more communication protocols as described in further detail herein, and may include features to enable wireless communication with external and/or remote devices separate from the user device 231. The user device 231 may further include a user interface (e.g., a display screen, a microphone, speakers, input elements such as a keyboard or touch screen, etc.) as known in the art.

Figure 4B:
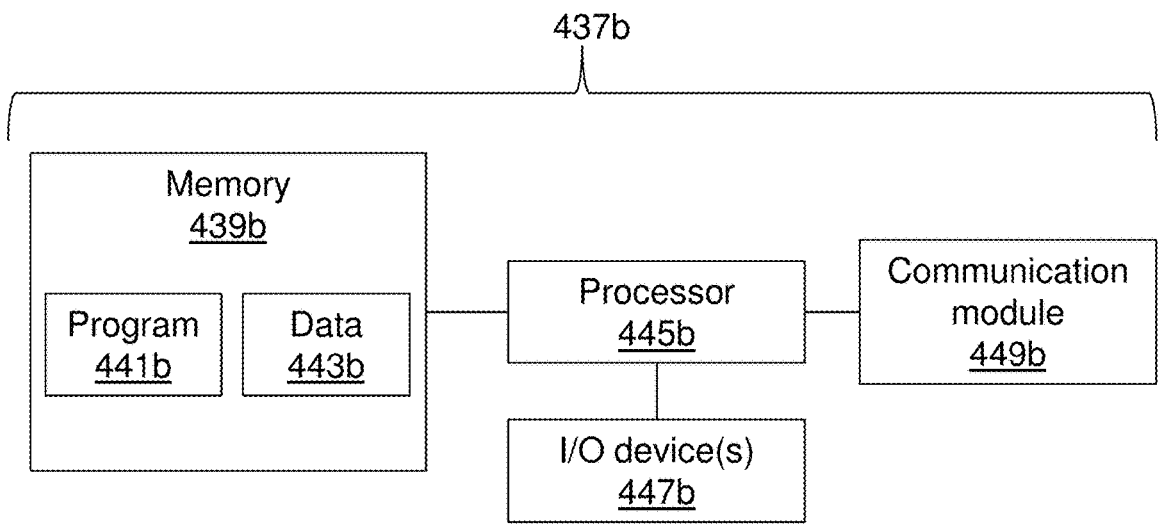
FIG. 4B is a schematic illustration of a computing system of an elevator controller in accordance with an embodiment of the present disclosure.

The elevator controller 215 may include a processor, memory, and a communication module as shown in FIG. 4B. Similar to the user device 231, the processor memory, and communication module may be implemented as described above, but as part of the elevator system 201.

Figure 3:
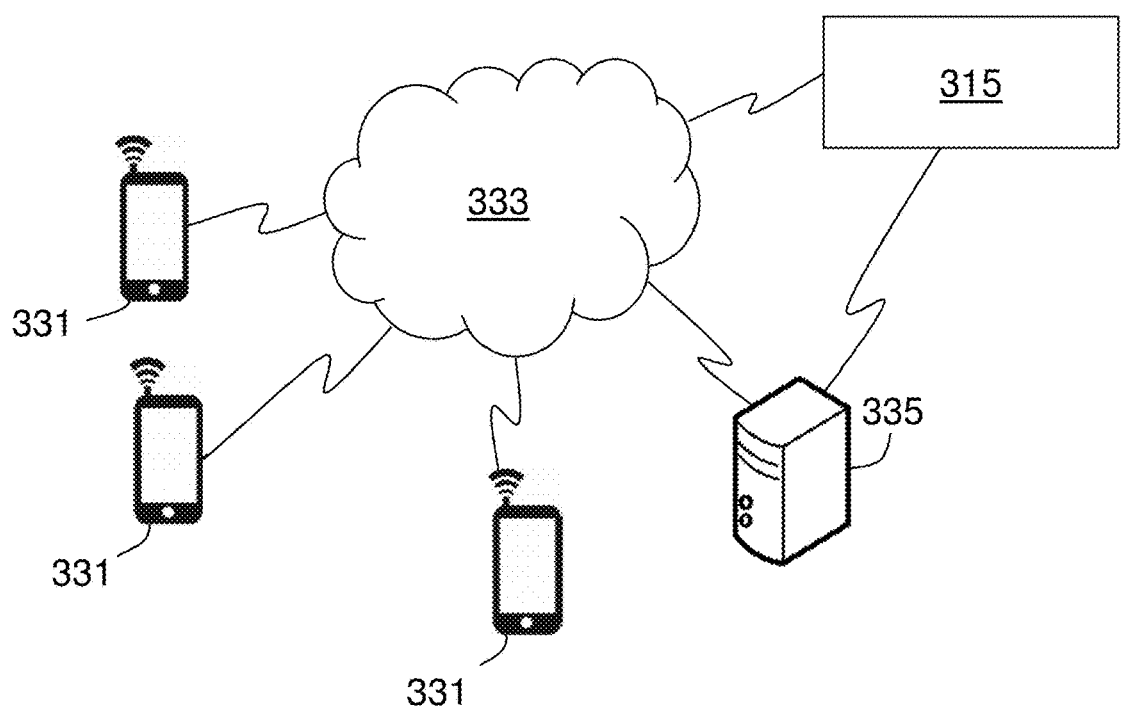
FIG. 3 is a schematic illustration of a system in accordance with an embodiment of the present disclosure.

A user device and an elevator controller in accordance with embodiments of the present disclosure can communicate with one another, e.g., as shown in FIG. 3. For example, one or more user device 331 and the elevator controller 315 may communicate with one another when proximate to one another (e.g., within a threshold distance). The user device 331 and the elevator controller 315 may communicate over a network 333, that may be wired or wireless. Wireless communication networks can include, but are not limited to, Wi-Fi, short-range radio (e.g., Bluetooth®), near-field infrared, cellular network, etc. In some embodiments, the elevator controller 315 may include, or be associated with (e.g., communicatively coupled to) one or more networked building elements 335, such as computers, kiosks, beacons, hall call fixtures, lanterns, bridges, routers, network nodes, etc. The networked element 335 may also communicate directly or indirectly with the user devices 331 using one or more communication protocols or standards (e.g., through the network 333).

For example, the networked element 335 may communicate with the user devices 331 using near-field communications (NFC) (e.g., network 333) and thus enable communication between the user devices 331 and the elevator controller 315. In some embodiments, the elevator controller 315 may establish communication with one or more user devices 331 that are outside of the structure/building. Such connection may be established with various technologies including GPS, triangulation, or signal strength detection, by way of non-limiting example. Such technologies that allow communication can provide users and the system(s) described herein more time to perform the described functions. In example embodiments, the user devices 331 communicate with the elevator controller 315 over multiple independent wired and/or wireless networks. Embodiments are intended to cover a wide variety of types of communication between the user devices 331 and the elevator controller 315, and embodiments are not limited to the examples provided in this disclosure.

The network 333 may be any type of known communication network including, but not limited to, a wide area network (WAN), a local area network (LAN), a global network (e.g. Internet), a virtual private network (VPN), a cloud network, and an intranet. The network 333 may be implemented using a wireless network or any kind of physical network implementation known in the art. The user devices 331 and/or the networked devices 335 may be coupled to the elevator controller 315 through multiple networks 333 (e.g., cellular and Internet) so that not all user devices 331 and/or the networked devices 335 are coupled to the elevator controller 315 through the same network 333. One or more of the user devices 331 and the elevator controller 315 may be connected to the network 333 in a wireless fashion. In one non-limiting embodiment, the network 333 is the Internet and one or more of the user devices 331 execute a user interface application (e.g. a web browser) to contact the elevator controller 315 through the network 333.

Embodiments provided herein are direct to apparatuses, systems, and methods for making and fulfilling requests for elevator service. In some embodiments, a request for elevator service may be communicated over one or more lines, connections, or networks, such as network 333, e.g., a request made by a user device 331 and transmitted through the network 333 to the elevator controller 315 to request elevator service. The request for service may be initiated by a mobile device controlled by and/or associated with a user, in a passive or active manner. In some embodiments, the mobile device may be operative in conjunction with a Transmission Control Protocol (TCP) and/or a User Datagram Protocol (UDP). In some embodiments, a request for service may be authenticated or validated based on a location of the user device. In some embodiments, a request for service may be fulfilled in accordance with one or more profiles, such as one or more user or mobile device profiles. In some embodiments the profiles may be registered as part of a registration process. In some embodiments, an elevator system may be registered with a service provider.

As noted, the elevator controller 315 may be associated with an elevator system (e.g., elevator systems 101, 201). The elevator controller 315 may be used to process or fulfill the requests for elevator service that are submitted from one or more user devices 331. The requests for elevator service may be received through the network 333 from the one or more user devices 331 and/or the networked building elements 335, which may be mobile devices, including, but not limited to phones, laptops, tablets, smartwatches, etc. One or more of the user devices 331 may be associated with (e.g., owned by) a particular user. The user may use his/her user device(s) 331 to request elevator service.

For example, a user of a user device 314 may request service in an affirmative or active manner. The user may enter a request for elevator service using an I/O interface of the user device 331, as described herein. That is, in some embodiments, an application, app, or other program may be installed and operated on the user device 331 wherein the user may interact with the app or program to request elevator service.

In other embodiments, or in combination therewith, the user may request elevator service in a passive manner. For example, a profile may be established for the user or the particular user device 331, optionally as part of a registration process with, e.g., a service provider and/or through historical data tracking. The profile may contain a log of the user's history and/or activities, such as where the user has gone or traveled to, the user's preferences, or any other data that may be applicable to the user. In some embodiments, the user profile may be accessed or analyzed to determine the likelihood or probability that the user will request elevator service at a particular moment in time (e.g., a particular day or time of day). Resources may be provisioned or allocated to fulfill the request (e.g., an elevator car call or reservation may be placed) in the event that the probability of requested service, or consumption, or use of an elevator is anticipated.

The request for service may be conveyed or transmitted from the user device 331 through the network 333. For example, the request for service may be transmitted to and/or over the Internet and/or a cellular network. The network(s) 333 may include infrastructure that may be organized to facilitate cloud computing. For example, one or more servers, such as a primary message server, a backup message server, and a device commissioning message server may be employed as part of the network 333.

In some embodiments, the request for service may specify a type of service requested, at any level of detail or abstraction. For example, a first request for service may specify that elevator service is requested, a second request for service may specify one or more of a departure floor and/or a destination floor, and a third request for service may specify that elevator service is desired to accommodate a heavy load (e.g., freight or cargo) with a number of other users or passengers in an amount less than a threshold. In some embodiments, the request for service transmitted from the user device 331 may include an identifier associated with the user or the particular user device 331 in order to allow the elevator controller 315 to distinguish between users and/or user devices 331.

Referring now to FIGS. 4A-4B, schematic block diagram illustrations of example computing systems 437a, 437b for a user device 431 and an elevator controller 415, respectively, are shown. The computing system 437a may be representative of computing elements or components of user devices, networked elements, mobile devices, etc. as employed in embodiments of the present disclosure. The computing system 437b may be representative of computing elements or components of controllers, elevator controller, networked elements, computers, etc. For example, the computing system 437a can be configured as part of a user device 431, e.g., user device 231, 331 shown above. The computing system 437a can be configured to operate the user device 431, including, but not limited to, operating and controlling a touch-screen display to display various output and receive various input from a user's interaction with the touch-screen display. The computing system 437b can be configured as part of an elevator controller, e.g., elevator controller 115, 215, 315 shown above. The computing system 437b can be a computer or other type of controller that is physically connected or remote from mechanical control of the elevator system. The computing system 437b may be connected to various elements and components within a building that are associated with operation of an elevator system.

As shown, the computing system 437a includes a memory 439a which may store executable instructions and/or data. The executable instructions may be stored or organized in any manner and at any level of abstraction, such as in connection with one or more applications, apps, programs, processes, routines, procedures, methods, etc. As an example, at least a portion of the instructions are shown in FIG. 4A as being associated with a program 441a. The memory 439a can include RAM and/or ROM and can store the program 441a thereon, wherein the program 441a may be a mobile operating system and/or mobile applications to be used on the user device 431.

Further, the memory 439a may store data 443a. The data 443a may include profile or registration data (e.g., in a user device), a device identifier, or any other type(s) of data. The executable instructions stored in the memory 439a may be executed by one or more processors, such as a processor 445a, which may be a mobile processor in the user device 431. The processor 445a may be operative on the data 443a and/or configured to execute the program 441a. In some embodiments, the executable instructions can be performed using a combination of the processor 445a and remote resources (e.g., data and/or programs stored in the cloud (e.g., remote servers)).

The processor 445a may be coupled to one or more input/output (I/O) devices 447a. In some embodiments, the I/O device(s) 447a may include one or more of a physical keyboard or keypad, a touchscreen or touch panel, a display screen, a microphone, a speaker, a mouse, a button, e.g., parts or features of a telephone or mobile device (e.g., a smartphone. For example, the I/O device(s) 447a may be configured to provide an interface to allow a user to interact with the user device 431. In some embodiments, the I/O device(s) 447a may support a graphical user interface (GUI) and/or voice-to-text capabilities for the user device 431.

The components of the computing system 437a may be operably and/or communicably connected by one or more buses. The computing system 437a may further include other features or components as known in the art. For example, the computing system 437a may include one or more communication modules 449a, e.g., transceivers and/or devices configured to receive information or data from sources external to the computing system 437a. In one non-limiting embodiments, the communication modules 449a of the user device 431 can include a near-field communication chip (e.g., Bluetooth®, Wi-Fi, etc.) and a cellular data chip, as known in the art. In some embodiments, the computing system 437a may be configured to receive information over a network (wired or wireless), such as network 333 shown in FIG. 3. The information received over the network may be stored in the memory 439a (e.g., as data 443a) and/or may be processed and/or employed by one or more programs or applications (e.g., program 441a).

The computing systems 437a may be used to execute or perform embodiments and/or processes described herein, such as within and/or on user devices. For example, the computing system 437a of the user device 431 enables a user interface to enable a user to make service requests to an elevator. To make such service requests, the user device 431, and the computing system 437a thereof, may communicate with the computing system 437b of the elevator controller 415.

For example, as shown in FIG. 4B, the elevator controller 415 includes a computing system 437b that is used to receive commands and/or instructions (e.g., data) from remote devices, including, but not limited to, the user device 431. The computing system 437b is configured to control operation of and/or reservation of elevator cars within one or more elevator hoistways. The computing system 437b (and program 439b stored thereon) may be configured to process requests for elevator service received from one or more user devices (e.g., user device 431). As part of the processing, the computing system 437b may validate or authenticate the user device 437 such that only certain user devices 431 may be able to communicate and/or make elevator service requests to the elevator controller 415.

As shown, the computing system 437b of the elevator controller 415 includes components similar to that shown and described with respect to the computing system 437a of FIG. 4A. As such, the elevator controller computing system 437b includes a memory 439b with at least one program 441b and data 443b stored thereon. The data 443b may include profile or registration data (e.g., related to user devices), elevator car data, elevator control data and/or programs, or any other type(s) of data associated with control and/or operation of an elevator system. A processor 445b may be configured to receive service requests through a communication module 449b from one or more user devices 431. The computing system 437b may further include one or more I/O devices 447b, including, but not limited to, control connections to one or more elevator mechanical controls and/or elevator cars. Further, in some configurations, the I/O devices 447b can include a monitor or display screen as part of a user interactive computing system that is associated with the elevator system and/or elevator controller 415.

Figure 5A:
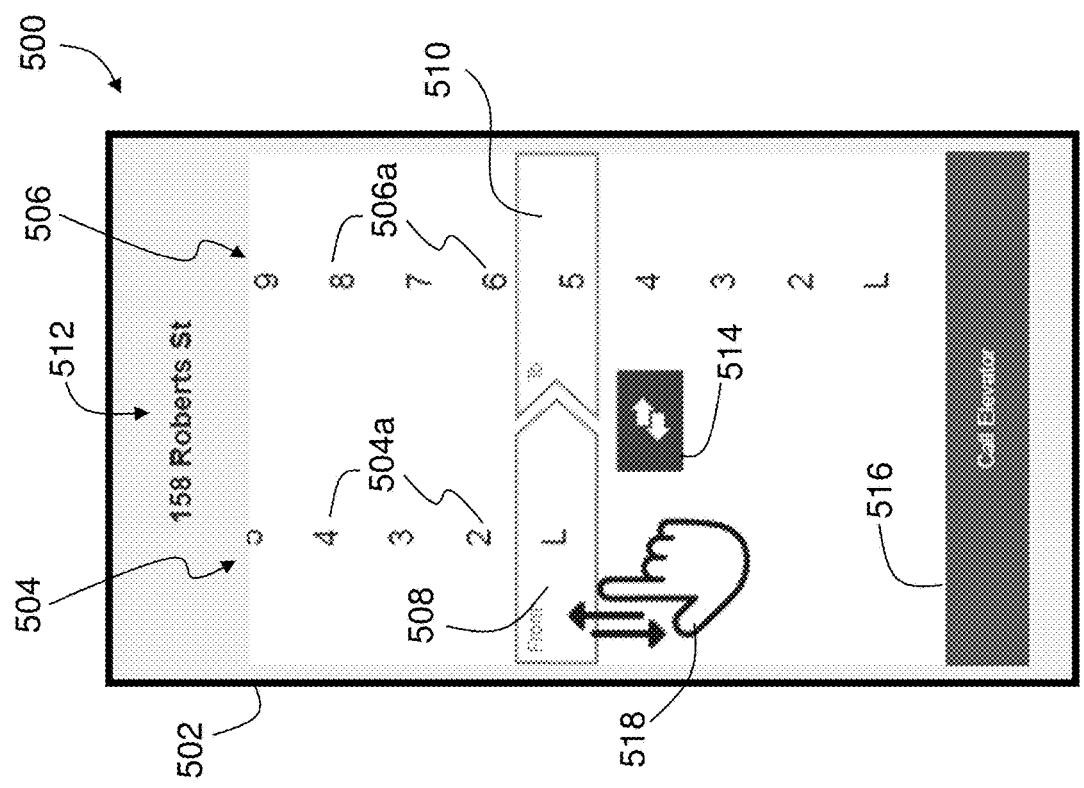
FIG. 5A is a schematic illustration of a user interface on a user device in accordance with an embodiment of the present disclosure.
Figure 5B:
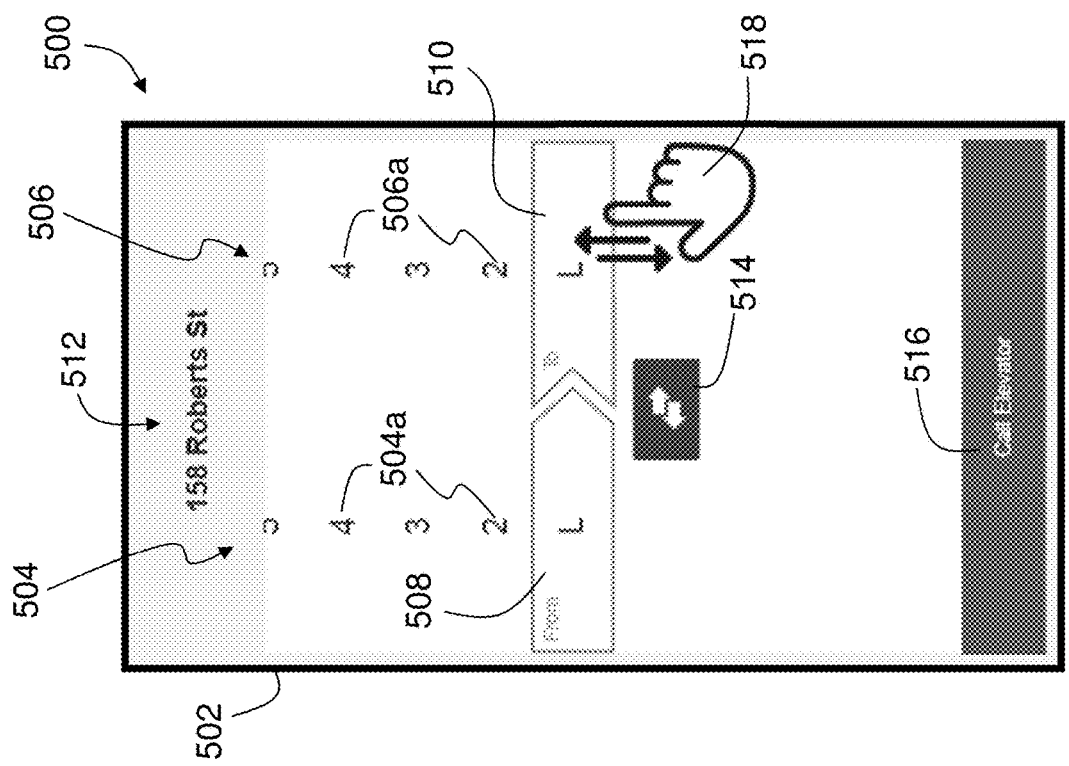
FIG. 5B is another schematic illustration of the user interface of FIG. 5A.

Turning now to FIGS. 5A-5D, various illustrations of a user interface 500 implemented on a user device in accordance with an embodiment of the present disclosure are shown. As shown in FIGS. 5A-5C, a screen 502 of a user device may display the user interface 500 that represents a screen or interface of an application in accordance with an embodiment of the present disclosure. The user interface 500 can enable a user to make elevator service requests by operation and interaction with the user interface 500 displayed on the screen 502. That is, the user interface 500 can enable a user device to communicate with an elevator controller to make an elevator service request. The user interface 500, as shown in the embodiments illustrated in FIGS. 5A-5D, includes two scrollable lists 504, 506, although various embodiments may include more than two scrollable lists or other display and/or interactive features. The scrollable lists 504, 506 are configured to each include a plurality of list elements 504a, 506a, respectively. The list elements 504a, 506a can be a listing of landing floors within a building. That is, the scrollable lists 504, 506 are configured to display a list of options that a user can select from to make an elevator service request to thus travel within a building based on the elevator service request that incorporates information and/or data from the scrollable lists 504, 506.

As shown in FIGS. 5A-5D, illustrated is a double scrolling mechanism for indicating "From" and "To" locations/floors. That is, a first scrollable list 504 can provide options (e.g., list elements 504a) to define a "From" or starting floor or landing of a building to be traveled from. A second scrollable list 506 is displayed next to the first scrollable list and provides a list of options (e.g., list elements 506a) for a "To" or destination floor or landing. In some embodiments, the contents or options of the first and second scrollable lists 504, 506 are the same and can be based on the accessible floors of an elevator system. As shown, the first and second scrollable lists are displayed in a single interactive image or user interface. As shown, each scrollable list 504, 506 has an associated selection box 508, 510 that is labeled "From" and "To." Although shown with specific shapes and words or indictors, those of skill in the art will appreciate that the selection boxes 508, 510 can have various geometries, color, indicators, words, icons, etc. without departing from the scope of the present disclosure. Further, each selection box 508, 510 and/or scrollable list 504, 504 can support all floor labels (e.g., alpha and/or numeric). In some embodiments, the scrollable lists 504, 506 can support front and rear door selection, indicate sky lobby floors (e.g., transfers between elevator shafts), or other aspects and/or features of the elevator system or elevator cars therein.

As shown, the user interface 500 includes additional features, which may be optional. For example, an information region 512 can be located within the user interface 500. As shown, the information region 512 provides information regarding the current building (e.g., an address) for which the user is using the interface 500 to communicate and/or control the elevator system. In some embodiments, such information region 512 can be static and/or defined by various information obtained by a user device (such as GPS, Wi-Fi location, etc.). In other embodiments, the information region 512 can be an interactive tab or other interactive feature that can enable a user to make selections, change displayed information, change the building selection to another building, etc. Although shown at the top of the user interface 500, the information region 512 can be located at any position on the user interface 500 and/or can take various geometric forms, colors, etc.

The user interface 500 is also shown having a swap icon 514. The swap icon 514 enables a user to swap the currently selected floors on the two scrollable lists 504, 506. For example, when a user selects to travel from a lobby to a fifth floor, they may wish to travel back to the lobby from the fifth floor, and the swap icon 514 enables easy change of the selected floors on each scrollable list 504, 506. In one non-limiting embodiment, the user interface (or memory associated therewith) stores or remembers the user's last selected trip and defaults to labeling those floors in the selection boxes 508, 510 (e.g., To/From). In one embodiment, the system may assume the user wishes to reverse their previous trip and will swap the numbers in the selection boxes 508, 510 (e.g., To/From). For example, the system may assume that if the user entered the building at the lobby and went to the 5th floor, that the user's next trip would be from the 5th floor to the lobby and preset such a trip in the selection boxes 508, 510 (e.g., To/From). Other preset pairings may be provided by the system and displayed on the user interface 500. In one embodiment, the system may: recognize that the user typically travels from the lobby to the 10th floor in the morning when reporting for work and preset the selection boxes 508, 510 (e.g., To/From) for such a trip; recognize that the user typically travels to the cafeteria on the 2nd floor around noon and preset the selection boxes 508, 510 (e.g., To/From) for such a trip at an appropriate time; the system may then preset the selection boxes 508, 510 (e.g., To/From) for a return trip from the 2nd floor (cafeteria) to the 10th floor after the user travels to the cafeteria; and finally the system may recognize that the user leaves the building in the evening and preset the selection boxes 508, 510 (e.g., To/From) for a trip from the 10th floor to the lobby. In one embodiment, the system and user interface 500 may sync with a user's electronic calendar or other scheduling device to preset the selection boxes 508, 510 (e.g., To/From) for any needed trips, including meetings on other floors within the building.

Finally, as shown, the user interface 500 includes a "Call Elevator" icon 516 that is used to make an elevator service request of an elevator system based on the selected floors of the scrollable lists 504, 506 and indicated within the respective selection boxes 508, 510. When the call elevator icon 516 is selected or actuated by a user, the user device will transmit a request to an associated elevator system, and an elevator car may be dispatched based on the service request.

Referring to FIGS. 5A-5D in sequence, the schematic illustrations provide a demonstration of use of the user interface 500. For example, as shown in FIG. 5A, a user 518 can scroll the second scrollable list 506 to position an alpha-numeric indicator within the second selection box 510. The second scrollable list 506 is, as shown, a digital scroll wheel that can be "spun" to change an element of the second scrollable list 506 that is located within the second selection box 510. As shown in FIG. 5B, the second scrollable list 506 is shown adjusted such that floor "5" is located within the second selection box 510.

Also shown in FIG. 5B, the user 518 can scroll the first scrollable list 504 to position an alpha-numeric indicator within the first selection box 508. The first scrollable list 504 is, as shown, a digital scroll wheel that can be "spun" to change an element of the first scrollable list 504 that is located within the first selection box 508. As shown in FIG. 5C, the first scrollable list 504 is shown adjusted such that floor "5" is located within the second selection box 510.

FIG. 5D illustrates possible actions the user 518 can take to make an elevator service request based on the selected information in the scrollable lists 504, 506 and selected in the selection boxes 508, 510. For example, as shown, the user 518 can perform a swiping action 520 across the first and second selection boxes 508, 510 to prompt the program of the user interface 500 to generate and send an elevator service request to an elevator controller. That is, an interactive call region 522 is defined about the first and second selection boxes 508, 510, and the user 518 can interact with the user interface 500 to make an elevator service request. Another option is for the user to press 524 a request button, e.g., call elevator icon 516. Those of skill in the art will appreciate that one or more types of interaction can be employed to make elevator service requests without departing from the scope of the present disclosure. In some embodiments, the call elevator icon 516 may be a swipable icon, rather than a press-based icon.

Embodiments provided herein enable a scrolling mechanic on a user device to provide easier selection for input of desired elevator travel within a building. In some embodiments, the number of list elements within a particular scrollable list can be a set number of floors or can be changed dynamically based on a particularly building configuration. For example, when a user with a user device having a program or application as described herein enters a building, the user device can obtain floor information regarding an elevator system (either directly or indirectly). From this information, the application can populate the scrollable lists with list elements that represent the floors that are accessing within the building by elevator. In addition and/or in alternative, the scrollable lists can be configured to display alternate floor names and/or locations that map to represented floors (e.g., additional or alternative information or names based on the floors of the building). In some embodiment, the two scrollable lists can have various scrolling mechanisms, and are not limited to the vertical scrolling shown in FIGS. 5A-5D. For example, horizontal or other directional scrolling can be employed without departing from the scope of the present disclosure. In one embodiment for use in, for example, a security controlled building, the scrollable lists may only display floors that the user is permitted to access. Alternatively, the scrollable lists could display all floors but grey-out floors or otherwise distinguish that the user is not permitted to access one or more specific floors shown on the scrollable list(s).

As noted above, the interactive call region 522, e.g., a selection area on the screen, defines the floor selection for both origin ("from") and destination ("to") within the selection boxes 508, 510. Because of the interactive call region 522, user precision may be reduced or relaxed, and thus a user is not required to be exactly precise with rotation of the scrollable lists 504, 506. That is, each list element 504a, 506a need only to be approximately positioned within the respective selection box 508, 510 by the user 518. Further, in some embodiments, the user interface 500 may include a "snap-in/elastic" mechanic to assist scrolling to specific list elements 504a, 506a within a tolerance when the user 518 is "drag-scrolling." Further, in some embodiments, the user interface 500 may also include speed scrolling to reach extreme ends of each scrollable list 504, 560 using a "flick" gesture."

Advantageously, the design of the selection boxes 508, 510 can increase user comprehension regarding selection of origin and destination floors when making an elevator service request. For example, as shown in FIGS. 5A-5D, the selection boxes 508, 510 have an arrow design of From/To selection areas which may increase comprehension of Origin-to-Destination for the user. Further, in some embodiments, the orientation of the arrow shape (or any shape of the selection boxes 508, 510) could change dynamically to reflect the actual direction of the trip, e.g., traveling up or down.

Further, as noted above, the swap icon 514 allows one-touch interaction with the user interface 500 to enable selection of a return trip that is based on a previous trip. As will be appreciated by those of skill in the art, the scrollable lists 504, 506 may be static between uses, such that the most recent/previous trip may be displayed to a user when the user interface 500 is first opened or displayed. However, the displayed and selected list elements 504a, 506a can be displayed based on various different program configurations. For example, the user interface 500 may reset to default floors (e.g., first floor for both the first and second scrollable lists 504, 506) each time the program is opened, the program can remember or store a previous floor pair, or may automatically swap selections for a return trip.

In some embodiments, additional scrollable lists may be provided on the user interface 500. For example, in some configurations, an additional scrollable list may be provided to enable a user to input a departure time (e.g., a request made in advance). Further, in some embodiments, an additional scrollable list may be provided to enable selection of a number of passengers to be traveling on the currently made request. In some embodiments, if a user device is held in portrait mode, two scrollable lists may be displayed, and if the user rotates the user device to a landscape mode, additional scrollable lists may populate the screen. In other embodiments, a user may be able to toggle various types of scrollable lists to be displayed on the user interface 500. Although two example types of additional scrollable lists are described above, those of skill in the art will appreciate that various types of scrollable lists providing features not explicitly described herein may be included without departing from the scope of the present disclosure.

Figure 6A:
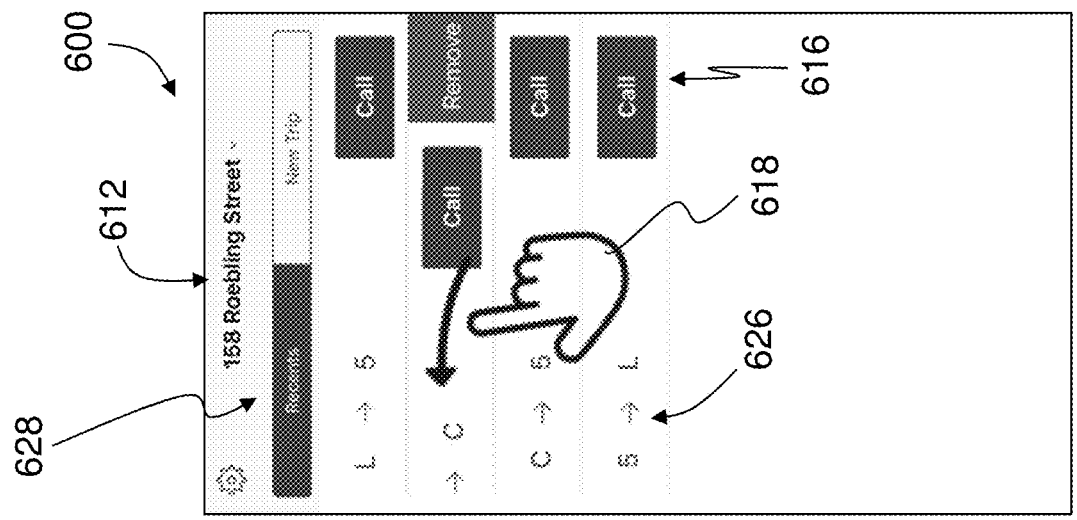
FIG. 6A is a schematic illustration of a user interface on a user device in accordance with another embodiment of the present disclosure.
Figure 6B:
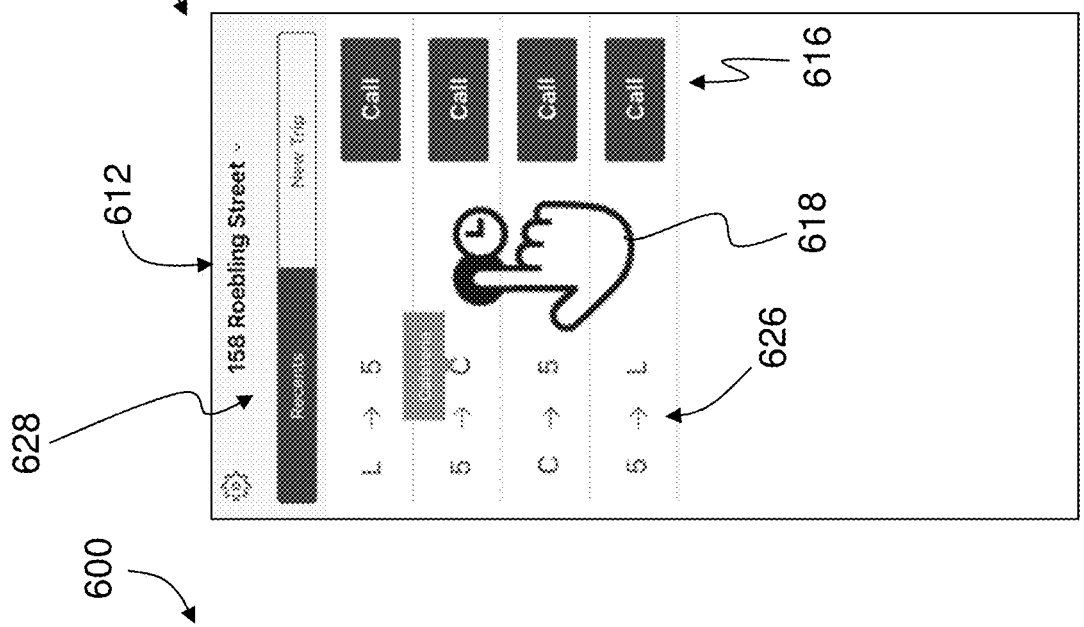
FIG. 6B is another schematic illustration of the user interface of FIG. 6A.
Figure 6C:
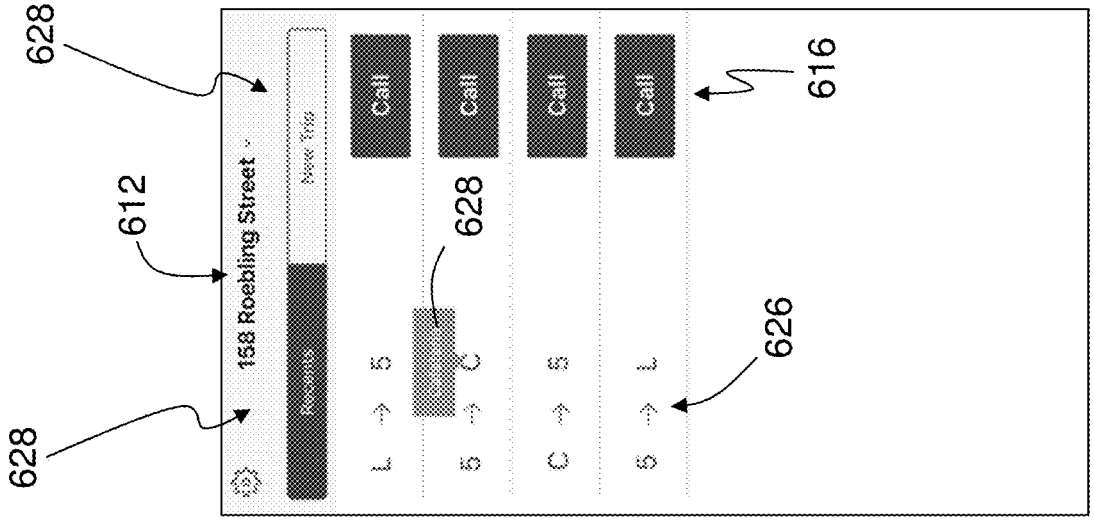
FIG. 6C is another schematic illustration of the user interface of FIG. 6A.

Turning now to FIGS. 6A-6C, alternative features of a user interface in accordance with an embodiment of the present disclosure are shown. FIG. 6A-6C illustrate different display features of a user interface 600 than that shown in FIGS. 5A-5D (user interface 500), but may be part of the same program or application, or may be entirely independent thereof.

The user interface 600 may be an interactive user interface that is part of a program or application that can be used to make elevator service requests, as described above. That is, the user interface 600 can be used for calling an elevator remotely. In the embodiment shown in FIGS. 6A-6C, retained floor pairs 626 may be stored in the application or program (or memory associated therewith). Embodiments provided herein enable simple ways to interact with the retained floor pairs 626, to gain more information related to one or more of the floors, to remove retained floor pairs 626, to rename the retained floor pairs 626, place an elevator service request to travel between the retained floor pairs 626, etc.

The retained floor pairs 626 may be set, established, or stored based on use of the features of the user interface 500 shown and described above with respect to FIGS. 5A-5D. In combination therewith, as described above with respect to FIGS. 5A-5D, and/or in accordance with other embodiments, the retained floor pairs 626 can be predefined, based on historical data of a particular user, based on popular origin-destination pairs of the particular building (e.g., cafeteria, gym, particular tenant, etc.), etc. As shown, the retained floor pairs 626 indicate an origin floor/landing on the left in FIG. 6A, a destination floor/landing on the right thereof, and a direction indicator between the origin and destination floor/landing. Each of the retained floor pairs 626 can include alphanumeric characters, as illustrated. Further, as shown, any of the elements of the retained floor pairs 626 can include additional information, icons, etc. For example, as shown, if a letter or other icon or indicator is used to designate an origination or destination floor, an information icon 628 can be displayed over the icon or indicator, to thus provide information to a user regarding the indicated floor. Further, such information icon can be displayed over a numbered floor and can provide information about the floor (e.g., if a cafeteria is located on the particular floor).

As shown, to the right of each retained floor pair 626 is a call elevator icon 616, similar to that described above with reference to FIGS. 5A-5D. The call elevator icon 616 can be pressed by a user to make an elevator service request based on the particular retained floor pair 626.

Further, as illustrated in FIG. 6B, a user 618 may press and hold on a retained floor pair 626, a display element thereof, and/or an information icon 628 to reveal more information about a particular or specific floor. Additionally, as illustrated in FIG. 6C, a user 618 may swipe (e.g., to the left) on the retained floor pair 626 to enable removal of the particular retained floor pair 626 from the list of retained floor pairs.

In some configurations, the user 618 may swipe to the right on a particular retained floor pair 626 to signal an intent to repeat that trip. The position of the call elevator icon 616 in association with a respective retained floor pair 626 may be modified by program or app configurations (e.g., locality). Further, in some embodiments, users may assign custom labels (e.g., "home," "gym," "cafeteria," "work," "HR," "dentist," etc.) to each retained floor pair 626. In such configuration, the user may interact with the custom label as indicated by the gestures described above. Further, for example, when pressing and holding a custom label, the alphanumeric information of the retained floor pair 626 may be revealed (e.g., display of floor numbers).

As shown, the user interface 600 further includes an information region 612, similar to that described above. In some embodiments, the information region 612 can include a dropdown menu to enable a user to select different addresses/buildings. Further, as shown, the information region 612 can include various interactive elements 628. In the illustrations of FIGS. 6A-6C, the interactive elements 628 include a "Recents" tab and a "New Trip" tab. In one non-limiting embodiments, a user can click on the "Recents" tab to display the user interface 600 shown in FIGS. 6A-6C. The "Recents" tab may provide a recents list or list of elevator trips that have recently or historically been taken by a user of the user device. That is, a recents list may be displayed to a user such that the user can view recent or historical elevator trips. The recents list can include one or more retained floor pairs 626, as shown in FIGS. 6A-6C.

Similarly, a user can click on the "New Trip" tab to display the user interface 500 shown in FIGS. 5A-5D. However, in some embodiments, the "New Trip" tab may bring up key pad to enable a user to input an origin and destination floor that is different from the user interface 500 of FIGS. 5A-5D (e.g., a numerical keypad).

In various configurations of a user interface 600 (e.g., similar to that shown in FIGS. 6A-6C), the recents list (i.e., the list of retained floor pairs) can be automatically sorted in chronological order, such that the most recent trip appears at the top of the list for easy access by a user. Further, the recents list can be automatically sorted by chronological order, may be sorted based on a time of day (e.g., based on historical data of the user), or may be sorted based on any other criteria. In some embodiments, the position of the call elevator icon 616 can be modified per user configuration and/or localization. Further, in some embodiments, a "seamless" mode may be used to prompt or provide a most recent retained floor pair 626 could be automatically displayed or toggled for ease of use.

In some embodiments, an elevator service request can be made by a swipe right gesture on a particular retained floor pair 626. Further, a particular retained floor pair 626 can be removed from the list with a swipe left gesture (or an option for "Remove" can be provided, as shown in FIG. 6C). As noted, a user can force-press/press-and-hold on a retained floor pair 626 or portion thereof to get more information or full name related to the retained floor pair 626 or part thereof. Further, as noted, a user can assign custom name(s)/phrase(s) for specific retained floor pairs 626 (which can be associated with an address, building, etc.).

Figure 7:
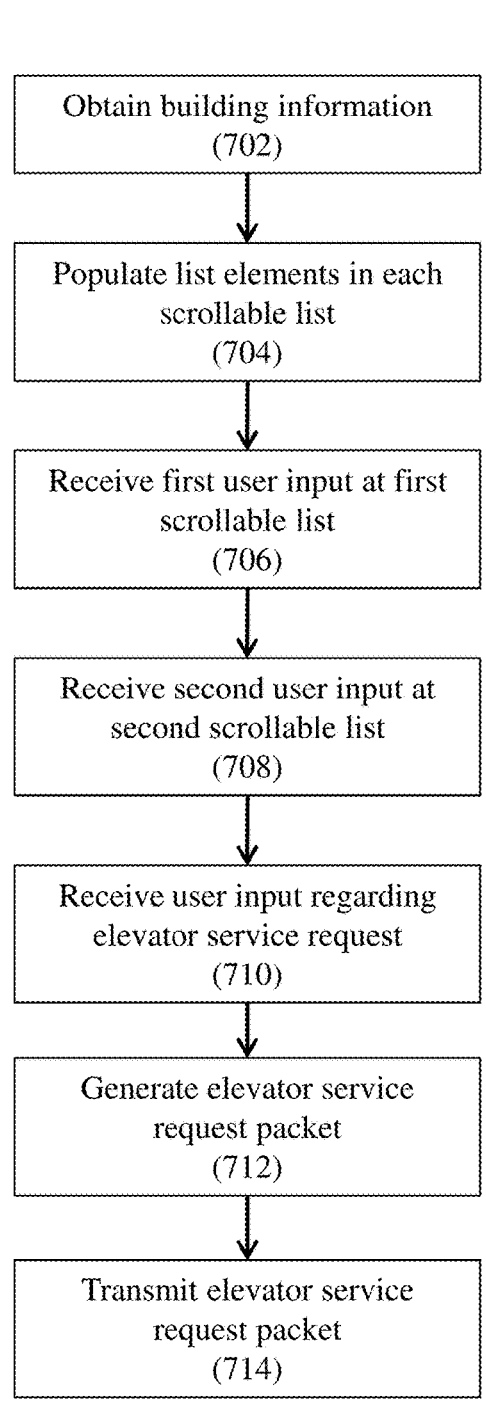
FIG. 7 illustrates a flow process for interacting with an elevator system in accordance with an embodiment of the present disclosure.

Referring now to FIG. 7, a flow process 700 is shown that may be used in connection with one or more entities, devices, or systems, such as those described herein. The flow process 700 may be used to receive user input requests and generate a request for elevator service and then transmit such request over one or more networks to thus make a remote request for elevator service. The flow process 700 may be a program or application functional process that can be performed using one or more processors, memory, input/output devices, etc. such as those shown and described above. In some embodiments, the flow process 700 can be performed on a user device as described above.

At block 702, the user device obtains building information over one or more networks (e.g., Wi-Fi, Bluetooth®, geolocation, RFID, local network, etc.). The building information can include information regarding one or more elevator systems located within the building. Such elevator system information can include all available floors to which elevator cars travel and/or information regarding the one or more floors (e.g., tenants, features of the floors, etc.).

At block 704, list elements are populated or set for each scrollable list of the application/program. That is, for example, the scrollable lists shown and described with respect to FIGS. 5A-5D can be populated with information related to the particular building in the user/user device are located. For example, two scrollable lists of a user interface can each be populated with all floor numbers or alphanumeric indicators (or other information) with each floor number or other indicator being a list element as shown and described above.

At block 706, a first user input request at one of the two scrollable lists is received. That is, for example, a user can scroll or otherwise manipulate a first scrollable wheel to adjust a list element that is displayed within a selection box of the user interface.

At block 708, a second user input request at the other of the two scrollable lists is received. That is, for example, a user can scroll or otherwise manipulate a second scrollable wheel to adjust a list element that is displayed within a selection box of the user interface.

At block 710, a user input request regarding an elevator service request is received. For example, after adjusting the two scrollable wheels (at blocks 706, 708), the user may swipe in an interactive call region of the user interface. Such swiping on the user interface can indicate a user's desire to request elevator service to travel between the elevator floors selected or indicated based on the input received at block 706, 708.

At block 712, an elevator service request packet can be generated within the user device. The elevator service request packet can be an electronic communication packet that is configured to be transmitted over one or more different types of communication networks and can be configured to be read by an elevator controller or a computer system/program associated with an elevator controller.

At block 714, the generated elevator service request packet can be transmitted to an elevator controller or network of the building to which the elevator controller is connected. Accordingly, an elevator service request can be generated and requested remotely by operation of a user device employing flow process 700.

The flow process 700 can incorporate additional features or steps without departing from the scope of the present disclosure. For example, after a request is generated, a memory can be configured to store and retain information related to the elevator service request that is generated (see, e.g., FIG. 8). Such information may include data related to the particular building, the time the elevator service request is made, where in the building or outside of the building the request is made from, if the request is similar or the same as prior requests in the same building, etc.

Figure 8:
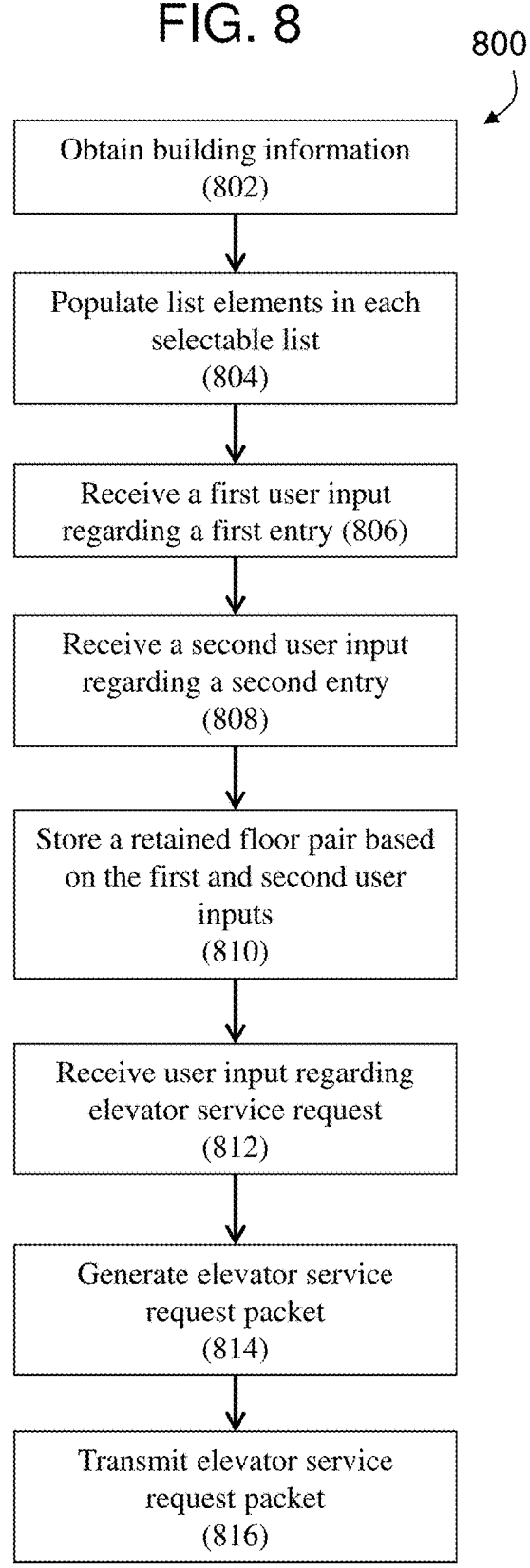
FIG. 8 illustrates a flow process for interacting with an elevator system in accordance with another embodiment of the present disclosure.

Turning now to FIG. 8, a flow process 800 in accordance with an embodiment of the present disclosure is shown. Flow process 800 may incorporate additional or alternative steps without departing from the scope of the present disclosure. The flow process 800 may be performed by a processor on a user device (e.g., as described above) with various related applications and/or data stored in a memory of the user device.

At block 802, the user device obtains building information over one or more networks (e.g., Wi-Fi, Bluetooth®, geolocation, RFID, local network, etc.). The building information can include information regarding one or more elevator systems located within the building. Such elevator system information can include all available floors to which elevator cars travel and/or information regarding the one or more floors (e.g., tenants, features of the floors, etc.).

At block 804, list elements are populated in one or more lists of the application/program on the user device. That is, for example, the scrollable lists shown and described with respect to FIGS. 5A-5D can be populated with information related to the particular building in the user/user device are located. In alternative configurations, the floor information can be retained digitally on the memory, and a user can interact with a floor selection key pad that can reference or be associated with the retained floor information. In still further embodiments, a user may use voice input to interact with and prompt the system to reference and select from the floor information.

At block 806, a first user input request is received regarding a first entry (e.g., selection of a "from" or origination floor). In some configurations, depending on the user interface, for example, a user can scroll or otherwise manipulate a first scrollable wheel to adjust a list element that is displayed within a selection box of the user interface. In other configurations, a user can provide the first user input request through selection or input on an alpha-numeric keypad (e.g., physical or digital) and/or voice input.

At block 808, a second user input request is received regarding a second entry (e.g., selection of a "to" or destination floor). In some configurations, depending on the user interface, for example, a user can scroll or otherwise manipulate a second scrollable wheel to adjust a list element that is displayed within a selection box of the user interface. In other configurations, a user can provide the second user input request through selection or input on an alpha-numeric keypad (e.g., physical or digital) and/or voice input.

At block 810, the first and second user input requests/entries are stored on a memory and are used to generate a retained floor pair, e.g., as described with respect to FIGS. 6A-6C. The flow process 800 can be repeated multiple times to form a retained floor pair list (e.g., multiple different retained floor pairs) or a recents list (which can be automatically populated).

At block 812, a user input request regarding an elevator service request is received with respect to one of the retained floor pairs. For example, after generating and storing one or more retained floor pairs, the user may swipe across one of the retained floor pairs of the user interface (e.g., on the retained floor pair list). Such swiping on the user interface can indicate a user's desire to request elevator service to travel between the elevator floors of the retained floor pair. In another embodiment, swiping may prompt a call elevator icon or button to appear, which can then be selected by the user. In other embodiments, a call elevator button may be displayed with and adjacent to the retained floor pair(s) (e.g., as shown in FIGS. 6A-6C), and a user may select the call elevator button to make an elevator service request.

At block 814, an elevator service request packet can be generated within the user device in response to the user input request received at block 812. The elevator service request packet can be an electronic communication packet that is configured to be transmitted over one or more different types of communication networks and can be configured to be read by an elevator controller or a computer system/program associated with an elevator controller.

At block 816, the generated elevator service request packet can be transmitted to an elevator controller or network of the building to which the elevator controller is connected. Accordingly, an elevator service request can be generated and requested remotely by operation of a user device employing flow process 800.

Aspects of the disclosure may be used in connection with one or more data mining applications. For example, patterns of elevator usage may be analyzed to suggest alternative times that users could consume elevator resources. Advertising opportunities may be available. For example, if a user profile indicates that the user likes to drink coffee, coupons for free coffee may be provided to the user as an incentive to utilize the elevator during off-peak times or periods.

As described herein, in some embodiments various functions or acts may take place at a given location and/or in connection with the operation of one or more apparatuses, systems, or devices. For example, in some embodiments, a portion of a given function or act may be performed at a first device or location (e.g., user device), and the remainder of the function or act may be performed at one or more additional devices or locations (e.g., elevator controller). Further, embodiments described herein may be implemented using one or more technologies. In some embodiments, an apparatus or system may include one or more processors and memory storing instructions that, when executed by the one or more processors, cause the apparatus or system to perform one or more methodological acts as described herein. Various mechanical components known to those of skill in the art may be employed without departing from the scope of the present disclosure.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

What is claimed is:

1. A method for making elevator service requests, the method comprising:

populating, by a computing device comprising a processor, a recents list with at least one retained floor pair, wherein each retained floor pair includes an origination floor and a destination floor;

displaying the recents list on a display of the computing device;

displaying an information region on the display, the information region including building information in a menu including a selectable list of two or more building addresses, each building address having a respective recents list;

receiving a user input on the information region indicating a selected building address of the two or more building addresses;

displaying a respective recents list associated with the selected building address, wherein the displayed respective recents list includes at least one retained floor pair associated with the selected building address;

receiving a user input on the recents list indicating a new elevator service request related to a selected retained floor pair associated with the selected building address;

generating an elevator service request packet based on the new elevator service request; and transmitting the elevator service request packet to an elevator controller to make an elevator service request.

2. The method of claim 1, wherein the elevator service request packet includes information including the origination floor and the destination floor.

3. The method of claim 1, wherein the computing device is a smartphone.

4. The method of claim 1, further comprising:
displaying a call elevator icon on the user interface in the recents list, the call elevator icon associated with the user input regarding an elevator service request; and
wherein the user input received on the recents list is at the call elevator icon.

5. The method of claim 1, further comprising:
receiving a swipe input on the recents list;
displaying a remove icon proximate the user input regarding an elevator service request;
receiving input at the remove icon; and
deleting the user input regarding an elevator service request based on the input received at the remove icon.

6. The method of claim 1, further comprising receiving a swipe input on the recents list, wherein generating the elevator service request packet is based on the swipe input.

7. The method of claim 1, further comprising:
receiving input to generate a new trip; and
displaying a first scrollable wheel and a second scrollable wheel, wherein each scrollable wheel includes a plurality of list elements associated with floors within the selected building address.

8. The method of claim 1, further comprising:
storing data related to a most recent elevator trip in a memory; and
displaying a retained floor pair associated with the most recent elevator trip on the display at a top of the recents list.

9. The method of claim 1, further comprising:
storing data related to a plurality of elevator trips in a memory, wherein the data comprises at least one of a time of day and a location of a user; and
displaying a retained floor pair associated with the data on the display at a top of the recents list.

10. A user device for making elevator service requests, the user device comprising:
at least one processor;
a display; and
memory having instructions stored thereon that, when executed by the at least one processor, cause the user device to:
populate a recents list with at least one retained floor pair, wherein each retained floor pair includes an origination floor and a destination floor;
display the recents list on the display;
display an information region on the user interface, the information region including building information in a menu including a selectable list of two or more building addresses, each building address having a respective recents list;
receive a user input on the information region indicating a selected building address of the two or more buildings addresses;
display a respective recents list associated with the selected building address, wherein the displayed respective recents list includes at least one retained floor pair associated with the selected building address;
receive a user input on the recents list indicating a new elevator service request related to a selected retained floor pair associated with the selected building address;
generate an elevator service request packet based on the new elevator service request; and
transmit the elevator service request packet to an elevator controller to make an elevator service request.

11. The user device of claim 10, wherein the elevator service request packet includes information including the origination floor and the destination floor.

12. The user device of claim 10, wherein the computing device is a smartphone.

13. The user device of claim 10, the instructions further comprising instructions to:
display a call elevator icon on the user interface in the recents list, the call elevator icon associated with the user input regarding an elevator service request; and
wherein the user input received on the recents list is at the call elevator icon.

14. The user device of claim 10, the instructions further comprising instructions to:
receive a swipe input on the recents list; and
display a remove icon proximate the user input regarding an elevator service request;
receive input at the remove icon; and
delete the user input regarding an elevator service request based on the input received at the remove icon.

15. The user device of claim 10, the instructions further comprising instructions to receive a swipe input on the recents list, wherein generating the elevator service request packet is based on the swipe input.

16. The user device of claim 10, the instructions further comprising instructions to:
receive input to generate a new trip; and
display a first scrollable wheel and a second scrollable wheel, wherein each scrollable wheel includes a plurality of list elements associated with floors within the selected building address.

17. The user device of claim 10, the instructions further comprising instructions to:
store data related to a most recent elevator trip in a memory; and
display a retained floor pair associated with the most recent elevator trip on the display at a top of the recents list.

18. The user device of claim 10, the instructions further comprising instructions to:
store data related to a plurality of elevator trips in a memory, wherein the data comprises at least one of a time of day and a location of a user; and
display a retained floor pair associated with the data on the display at a top of the recents list.

19. The user device of claim 10, the instructions further comprising instructions to:
identify a location of the user device, wherein the populated recents list is automatically populated based on the identified location.

20. The method of claim 1, further comprising identifying a location of the computing device, wherein the populated recents list is automatically populated based on the identified location.

* * * * *